(12) United States Patent
So et al.

(10) Patent No.: US 11,102,263 B2
(45) Date of Patent: Aug. 24, 2021

(54) METHOD AND APPARATUS FOR TRANSMITTING/RECEIVING PACKET IN MULTIMEDIA SYSTEM

(71) Applicant: Samsung Electronics Co., Ltd., Suwon-si (KR)

(72) Inventors: Young-Wan So, Gunpo-si (KR); Kyung-Mo Park, Seoul (KR); Jae-Hyeon Bae, Seoul (KR); Hyun-Koo Yang, Seoul (KR); Byeong-Doo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 15/765,906

(22) PCT Filed: Oct. 14, 2016

(86) PCT No.: PCT/KR2016/011583
§ 371 (c)(1),
(2) Date: Apr. 4, 2018

(87) PCT Pub. No.: WO2017/065571
PCT Pub. Date: Apr. 20, 2017

(65) Prior Publication Data
US 2018/0295171 A1    Oct. 11, 2018

(30) Foreign Application Priority Data
Oct. 14, 2015   (KR) .................. 10-2015-0143729

(51) Int. Cl.
*H04L 29/06*    (2006.01)

(52) U.S. Cl.
CPC ........ *H04L 65/601* (2013.01); *H04L 65/4069* (2013.01); *H04L 65/605* (2013.01);
(Continued)

(58) Field of Classification Search
CPC ....... H04L 65/601; H04L 69/22; H04L 69/03; H04L 65/608; H04L 65/605; H04L 65/4069; H04L 65/607; H04L 29/06
(Continued)

(56) References Cited

U.S. PATENT DOCUMENTS

2002/0009151 A1   1/2002   Gentric
2006/0013123 A1   1/2006   Ryu et al.
(Continued)

FOREIGN PATENT DOCUMENTS

CN    1386375 A    12/2002
CN    1710911 A    12/2005
(Continued)

OTHER PUBLICATIONS

Chinese Office Action dated Jun. 2, 2020, issued in Chinese Patent Application No. 201680060040.2.

*Primary Examiner* — Minh Chau Nguyen
*Assistant Examiner* — Mehlukumar J Shah
(74) *Attorney, Agent, or Firm* — Jefferson IP Law, LLP (57) ABSTRACT

Disclosed is a method by which a multimedia device processes a multimedia packet. To this end, a multimedia packet, which comprises a header including a type information field having type information recorded therein, and a payload including data of a type indicated by the type information, is received, and, when it is recognized that null data is not included in the payload by the type information, the data included in the payload may be processed.

16 Claims, 6 Drawing Sheets

(52) U.S. Cl.
CPC .......... *H04L 65/607* (2013.01); *H04L 65/608* (2013.01); *H04L 69/03* (2013.01); *H04L 69/22* (2013.01)

(58) Field of Classification Search
USPC ........................................ 709/231, 230, 219
See application file for complete search history.

(56) References Cited

U.S. PATENT DOCUMENTS

| | | | |
|---|---|---|---|
| 2008/0198876 A1* | 8/2008 | Stranger | H04J 3/1682 370/474 |
| 2009/0080452 A1 | 3/2009 | Ra et al. | |
| 2011/0134982 A1* | 6/2011 | Reinhardt | H04L 1/0071 375/224 |
| 2011/0246616 A1 | 10/2011 | Ronca et al. | |
| 2012/0155398 A1 | 6/2012 | Oyman et al. | |
| 2013/0301656 A1 | 11/2013 | Park et al. | |
| 2014/0230004 A1* | 8/2014 | Kim | H04N 21/2353 725/116 |
| 2014/0317664 A1* | 10/2014 | Park | H04N 21/2381 725/109 |
| 2015/0046967 A1* | 2/2015 | Yoshioka | H04N 21/236 725/118 |
| 2015/0089560 A1 | 3/2015 | Park et al. | |

FOREIGN PATENT DOCUMENTS

| | | |
|---|---|---|
| CN | 103262630 A | 8/2013 |
| CN | 103380626 A | 10/2013 |
| CN | 103875261 A | 6/2014 |
| CN | 104303507 A | 1/2015 |
| KR | 10-2009-0031059 A | 3/2009 |
| KR | 10-1373414 B1 | 3/2014 |

* cited by examiner

METHOD AND APPARATUS FOR TRANSMITTING/RECEIVING PACKET IN MULTIMEDIA SYSTEM

CROSS-REFERENCE TO RELATED APPLICATION(S)

This application is a National Phase Entry of PCT International Application No. PCT/KR2016/011583, which was filed on Oct. 14, 2016, and claims priority to Korean Patent Application No. 10-2015-0143729, which was filed on Oct. 14, 2015, the contents of which are incorporated herein by reference.

BACKGROUND

1. Field

The present disclosure relates to a method and a device for transmitting/receiving a multimedia data packet based on MPEG media transport (MMT) technology in a multimedia system.

2. Description of the Related Art

Recently, MPEG media transport (MMT) technology has been considered for multimedia services in order to provide hybrid content, in which multimedia data, applications, and files are simultaneously provided, in a hybrid network connecting to both a broadcast network and a communication network.

The MMT technology may cope with some limitations of MPEG-2 TS (Moving Picture Experts Group-2 Transport Stream) that is a representative technology to support multimedia services. That is, the MMT technology has been proposed by the MPEG in order to overcome the limitations of the MPEG-2 TS, such as unilateral communication, inefficient transmission due to a fixed frame size, or overhead caused by transmission using a transmission protocol and an Internet protocol (IP), which are specialized for audio/video.

For example, the MMT technology may be applied to efficiently transmit hybrid content through a heterogeneous network. Here, the hybrid content means a group of content having multimedia elements by means of video/audio/application, and the like. The heterogeneous network refers to a hybrid network including both a broadcast network and a communication network.

In addition, the MMT technology has an objective of defining more IP-friendly transmission technology, which is a fundamental technology in a transmission network for multimedia services.

Therefore, the MMT technology is mainly intended to provide efficient MPEG transmission technology in a multimedia service environment, which varies based on the IP, and continuous studies thereon are being conducted with standardization thereof.

SUMMARY

An embodiment of the present disclosure provides a method and a device for transmitting/receiving packets in a multimedia system.

In addition, an embodiment of the present disclosure provides a method and a device for performing an efficient process of transmitting a media packet in a multimedia system.

Furthermore, an embodiment of the present disclosure provides a method and a device for preferentially detecting and receiving a media packet including specific media data or specific information in a multimedia system.

A method of processing a multimedia packet in a multimedia device, according to an embodiment proposed in the present disclosure, may include: receiving a multimedia packet including a header including a type information field having type information recorded therein and a payload including a type of data indicated by the type information; and processing data included in the payload if it is recognized that null data is not included in the payload through the type information.

A multimedia device, according to an embodiment proposed in the present disclosure, may include: a receiver that receives a multimedia packet including a header including a type information field having type information recorded therein and a payload including a type of data indicated by the type information; and a controller that processes data included in the payload if it is recognized that null data is not included in the payload through the type information.

A method of transmitting a multimedia packet in a multimedia device, according to an embodiment proposed in the present disclosure, may include: generating a multimedia packet using a header and a payload; and transmitting the generated multimedia packet,
wherein the generating of the multimedia packet may include:
determining whether or not null data needs to be added to the payload; and if it is determined that the null data needs to be added to the payload, generating the multimedia packet by the payload including, in whole or in part, the null data and a header including a type field having type information recorded therein, which indicates that the payload includes, in whole or in part, the null data.

According to an embodiment proposed in the present disclosure, a multimedia device may include: a controller that generates a multimedia packet using a header and a payload; and a transmitter that transmits the generated multimedia packet,
wherein the controller, if it is determined that null data needs to be added to the payload, generates the multimedia packet by the payload including, in whole or in part, the null data and a header including a type field having type information recorded therein, which indicates that the payload includes, in whole or in part, the null data.

According to various embodiments proposed in the present disclosure, it is possible to provide multimedia services without delay by promptly processing multimedia data, metadata, and signaling information directly related to reproduction of media data in a multimedia system.

BRIEF DESCRIPTION OF DRAWINGS

The above and other aspects, features, and advantages, of the present disclosure will be more apparent from the following detailed description taken in conjunction with the accompanying drawings, in which.

It should be noted that similar reference numerals are used to denote identical or similar elements, features, and structures in the drawings.

DETAILED DESCRIPTION

In the following description of embodiments of the present disclosure, a detailed description of known functions or configurations incorporated herein will be omitted when it is determined that the detailed description thereof may unnecessarily obscure the subject matter of the present disclosure. Although the following embodiments of the present disclosure will be described separately for the convenience of description, two or more embodiments may be combined within the range where they are not in conflict with each other.

In addition, the present disclosure may have various embodiments and various changes and modification may be made to the embodiments of the present disclosure, and therefore particular embodiments will be described in detail with reference to the accompanying drawings. However, it should be understood that the present disclosure is not limited to the specific embodiments, but the present disclosure includes all modifications, equivalents, and alternatives within the spirit and the scope of the present disclosure. The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The following detailed description, according to the present disclosure, will be made of, as an example, a multimedia system based on an MMT protocol. However, various embodiments proposed in the present disclosure may be applied to various multimedia systems for providing the same or similar services, as well as the multimedia system based on the MMT protocol.

The MMT protocol is an application-layer transport protocol for packetizing and transmitting an MMT package, and has been designed in order to efficiently and reliably transmit a package. The MMT protocol has improved features such as media multiplexing and network jitter calculation. These features have been proposed to efficiently transmit content comprised of various types of encoded media data. The MMT protocol may operate in an upper layer of an existing network protocol, such as UDP or IP, and has been designed to support various applications.

Hereinafter, the present disclosure will be described in detail with reference to the accompanying drawings.

Figure 1:
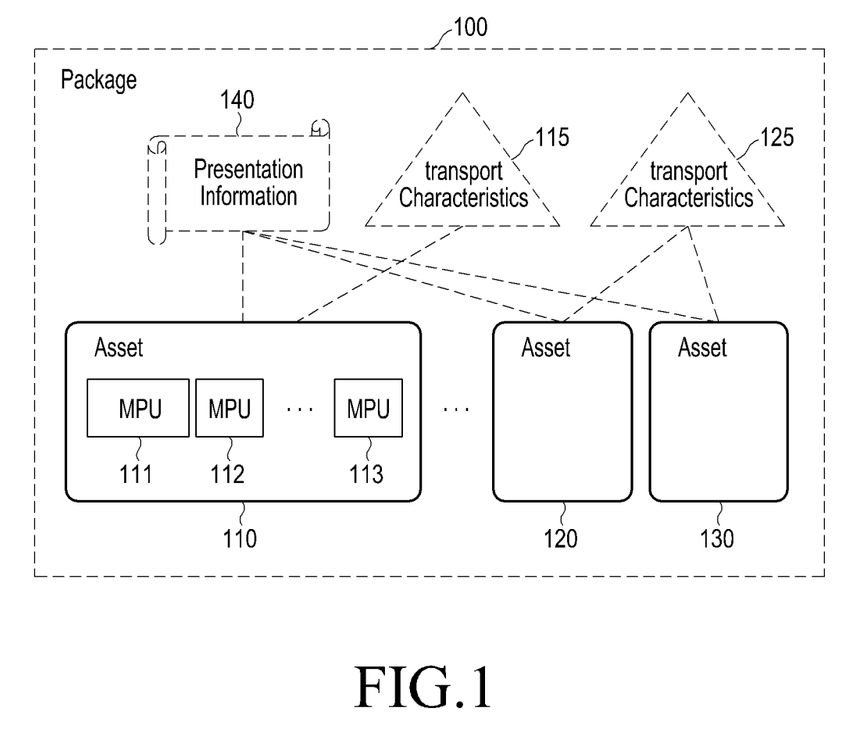
FIG. 1 is a view illustrating an MMT data model in a multimedia communication system.

FIG. 1 is a view explaining an MMT data model in a multimedia communication system.

Referring to FIG. 1, in the MMT technology, a group of encoded media data and metadata related thereto is defined as a package 100. The package 100 may contain one or more MMT assets 110, 120, and 130, one or more asset delivery characteristics (ADCs) 115 and 125 (or "transport characteristic" information), and at least one piece of presentation information (PI) 140. The package 100 may be a piece of content such as a movie.

The MMT asset may be one of various types of multimedia data. The multimedia data may be used to generate multimedia presentations such as video, audio, text, file, and the like.

Each of the MMT assets 110, 120, and 130 may be divided into one or more media processing units (MPUs). For example, the first MMT asset 110 may be divided into a plurality of MPUs 111, 112, and 113. The MPU is a unit in which an MMT stream is processed independently. The MPU may be a unit of media data that may be independently decoded.

Although it is not shown in the drawings, one MPU may be divided into a plurality of fragments. In this case, the fragment is called an MPU fragment unit (MFU).

An MMT sending entity may divide and process the media data into MPU units. An MMT receiving entity may receive media data in the unit of MPUs, and may perform a process of reproduction.

The ADC includes information on the transport characteristics of the corresponding MMT asset for each MMT asset. For example, the ADC 115 represents the transport characteristics of the first asset 110 and the ADC 125 represents the transport characteristics of the second asset 120 and the third asset 130. The presentation information (PI) 140 includes information describing a time-and-space relationship between a plurality of assets 110, 120, and 130, and defines a transport sequence of the MMT assets in the package.

In a multimedia system to which the aforementioned MMT data model is applied, the MMT sending entity may packetize media data configured in a unit of MPUs into a plurality of MMTP (MMT protocol) packets to thus transmit the same, and the MMT receiving entity may reproduce the media data reconfigured by depacketizing a plurality of received MMTP packets in a unit of MPUs.

For example, one MPU may be packetized into multiple MMTP packets to then be transmitted. In this case, an MFU, which is a piece divided from the one MPU, may be transmitted through at least one payload of the MMTP packet (hereinafter, referred to as 'MMTP payload'). The MMTP packet means a formatted unit of media data to be transmitted using an MMT protocol. The MMTP packet carries the MMTP payload. The MMTP payload may transmit a package and/or a signaling message using an MMT protocol or an Internet application transport layer protocol {e.g., real time protocol (RTP)}. The MMTP payload may mean a formatted unit of media data. For example, the MMTP payload may include MPU metadata, fragment metadata, an MFU, or signaling information. The MPU metadata may include information for identifying the corresponding MPU, information for decoding media data, and the like. The signaling information may include various pieces of control information for delivery and consumption of the package. For example, the MMT sending entity may provide the MMT receiving entity with information on the structure of the package, the protocol configuration, the structure of the MMTP payload, and the like through the signaling message.

As described above, the media data may be divided into a plurality of MMTP packets to then be transmitted in the MMT-based multimedia system. That is, the media data may be transmitted using a packetized media stream. The MPU metadata and the signaling information transmitted through the plurality of MMTP packets may be essential information for decoding or reproducing the media data in the receiving entity.

In addition, in order to transmit data at the same speed, a transmitting side may need to maintain the size of the transmitted MMTP packet constant. An example of maintaining the size of the MMTP packet constant may be adding null data, instead of the media data, to the MMTP payload constituting the MMTP packet. The null data may be added, in whole or in part, to the MMTP payload. In this case, in order to quickly process the received MMTP packet, the multimedia device is required to distinguish between an MMTP packet that does not include null data and an MMTP packet that includes null data. For example, the MMTP packet, which does not include null data, may be an MMTP packet having an MMTP payload including MPU metadata, signaling information, and data of an intra-coded frame (I-frame) among the image frames.

Figure 2:
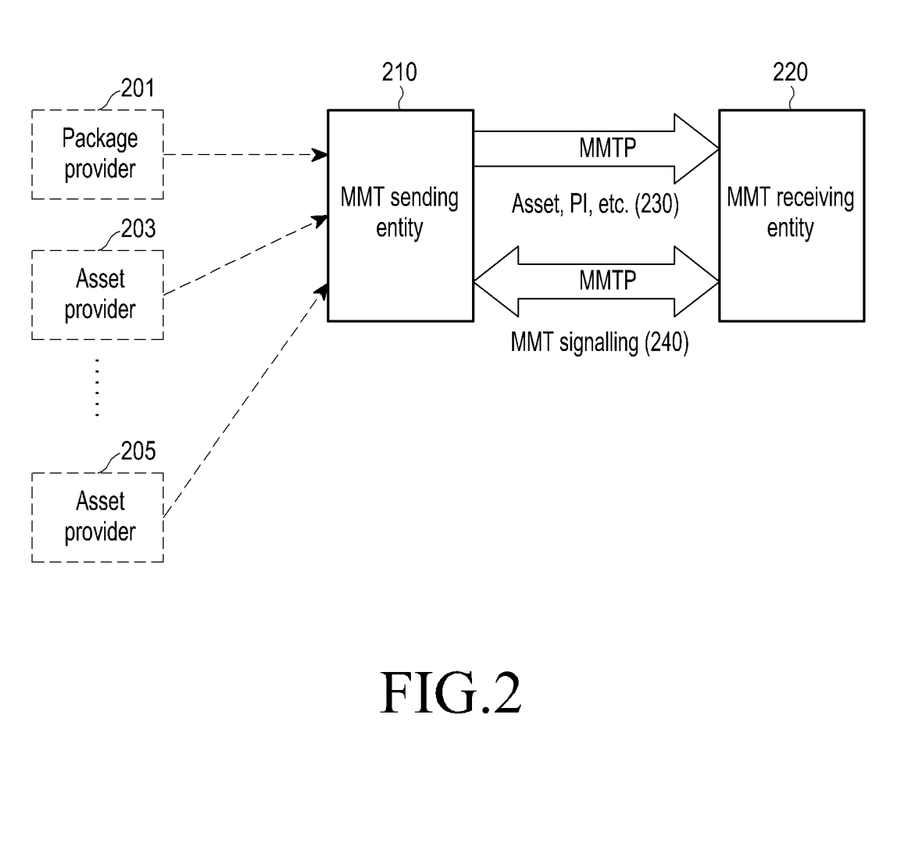
FIG. 2 is view showing the configuration of a multimedia system for transmitting/receiving an MMTP packet according to the embodiment of the present disclosure.

FIG. 2 is view showing the configuration of a multimedia system for transmitting/receiving an MMTP packet according to the embodiment of the present disclosure.

Referring to FIG. 2, the multimedia device may include an MMT sending entity 210 (hereinafter, referred to as "sending entity") and an MMT receiving entity 220 (hereinafter, referred to as "receiving entity"). The sending entity 210 and the receiving entity 220 may be configured in a single multimedia device, or may be configured in different multimedia devices. The sending entity 210 may have configurations to transmit multimedia packets in a multimedia device. The receiving entity 220 may have configurations to receive and process the multimedia packet in the multimedia device.

The sending entity 210 transmits a package including media data to the receiving entity 220 based on the MMTP packet flow. The package, for example, may be a piece of content such as a movie, a drama, and the like.

The sending entity 210 may be any entity that transmits media data and the receiving entity 220 may be any entity that receives media data. For example, the sending entity 210 may be an MMT broadcasting server, and the receiving entity 220 may be a wireless terminal or a mobile terminal (hereinafter, all of which will be referred to as "terminal") as an MMT client.

For example, if the sending entity 210 is an MMT broadcasting server, the media data transmitted from the MMT broadcasting server may be transmitted to the terminal through a base station or an access point (AP) in a wireless communication system. In this case, the MMT broadcasting server may be a multimedia device including the sending entity 210, and the terminal may be a multimedia device including the receiving entity 220.

The sending entity 210 may receive desired content from one or more asset providers 203 and 205 using presentation information (PI) provided by one package provider 201. For example, the sending entity 210 may collect content from the asset providers 203 and 205 based on the PI of the package provided by the package provider 201. Here, the package provider 201 and the asset providers 203 and 205 may be configured as separate entities or combined entities.

The sending entity 210 may transmit a package including the assets, the control information, or the PI to the receiving entity 220 using an MMT protocol (230). The sending entity 210 and the receiving entity 220 may transmit and receive signaling information using the MMTP (240).

The sending entity 210 may divide the media data into a plurality of MMTP packets, and may transmit the same to the receiving entity 220. In this case, the sending entity 210 may transmit MPU metadata and signaling information through some of the plurality of MMTP packets. The MMTP packet may be referred to as a media packet or a multimedia packet because it transmits media data.

Figure 3:
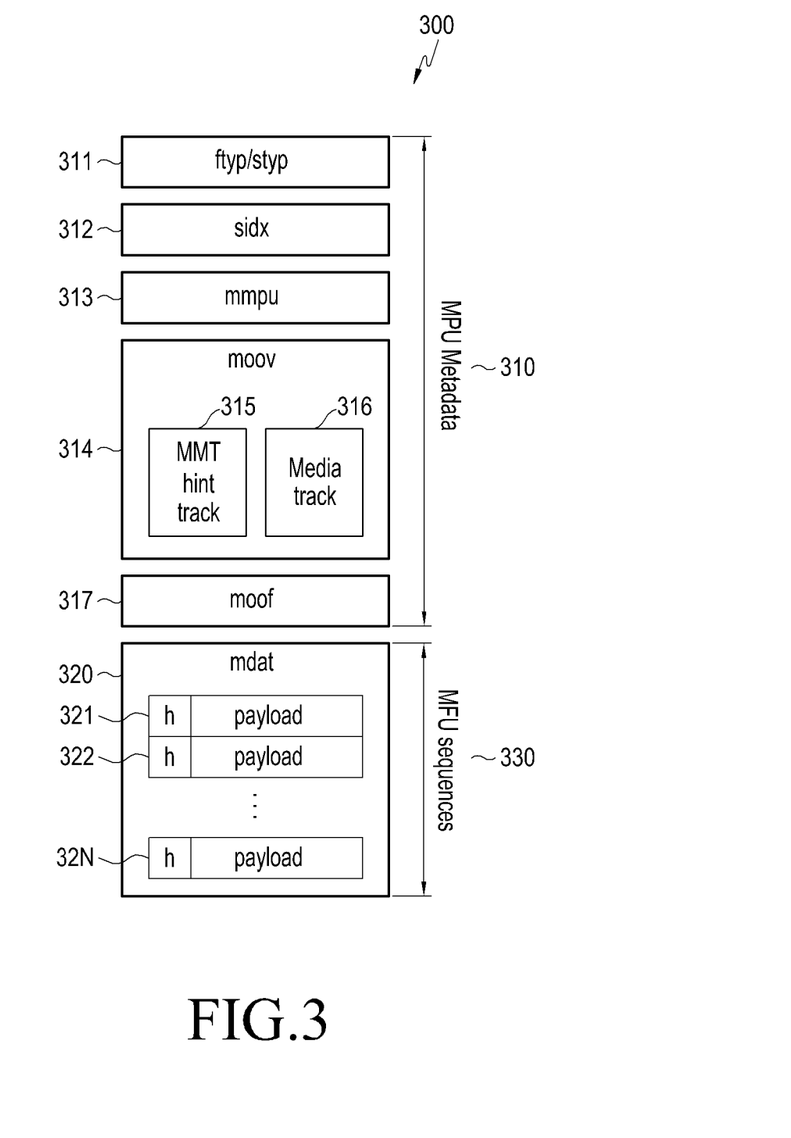
FIG. 3 is a view the structure of an MPU in a multimedia system according to the embodiment of the present disclosure.

FIG. 3 is a view an MPU structure of a multimedia system according to the embodiment of the present disclosure.

Referring to FIG. 3, the MPU structure may have an international standardization organization base media file format (ISOBMFF) including MPU metadata.

An MMT-based multimedia system (hereinafter, referred to as MMT system) may support both timed data and non-timed data. The timed data may have time information for decoding such as a streaming service. The non-timed data may not have time information for decoding, as a general file transfer service. FIG. 3 shows an MPU structure of the timed data for the convenience. The MPU structure of the non-timed data (not shown) may also include MPU metadata.

In the MMT system, the MPU may be encapsulated according to the ISOBMFF. An ISO-based media file 300, in which the MPU is encapsulated, may be divided into an MPU metadata area 310 and an MFU sequence area 330. The MPU metadata area 310 may include at least one of an ftyp/styp box 311, a sidx box 312, an mmpu box 313, a moov box 314, and a moof box 317, and the MFU sequence area 330 may include an mdat box 320.

The ftyp/styp box 311 includes type information of media data, and the sidx box 312 includes index information of fragments constituting the MPU. The mmpu box 313 includes an identifier of an asset to which the current MPU belongs and other information of the current MPU. The mmpu box 313 includes information ("is complete") indicating whether or not the current MPU includes all of the MFUs. The moov box 314 includes all of the codec setting information for decoding and presentation of media data. The moov box 314 may include an MMT hint track 315 for the MFUs and at least one media track 316. The MMT hint track 315 includes information necessary for converting the media file 300 containing the MPU into a packetized media stream using a transport protocol such as an MMT protocol. That is, the MMT hint track 317 includes information necessary for generating a plurality of MFUs constituting one MPU.

The MPU metadata may be considered as essential information for decoding or reproducing the media data included in the MPU. The receiving entity needs to preferentially detect and receive the MMTP packet including the MPU metadata from among a plurality of MMTP packets transmitted after dividing and packetizing the MPU.

The mdat box 320 may include one or more MFUs (e.g., 321, 322 to 32N). The one or more MFUs (e.g., 321, 322 to 32N) may be generated by dividing the MPU file containing the MPU metadata and the MPU media data. An example of this will be described below with reference to FIG. 4.

Each of the MFUs (e.g., 321, 322 to 32N) may be comprised of an MFU header (h) and an MFU payload. The MPU metadata may include at least one of the ftyp/styp box 311, the sidx box 312, the mmpu box 313, the moov box 314, and the moof box 317.

Figure 4:
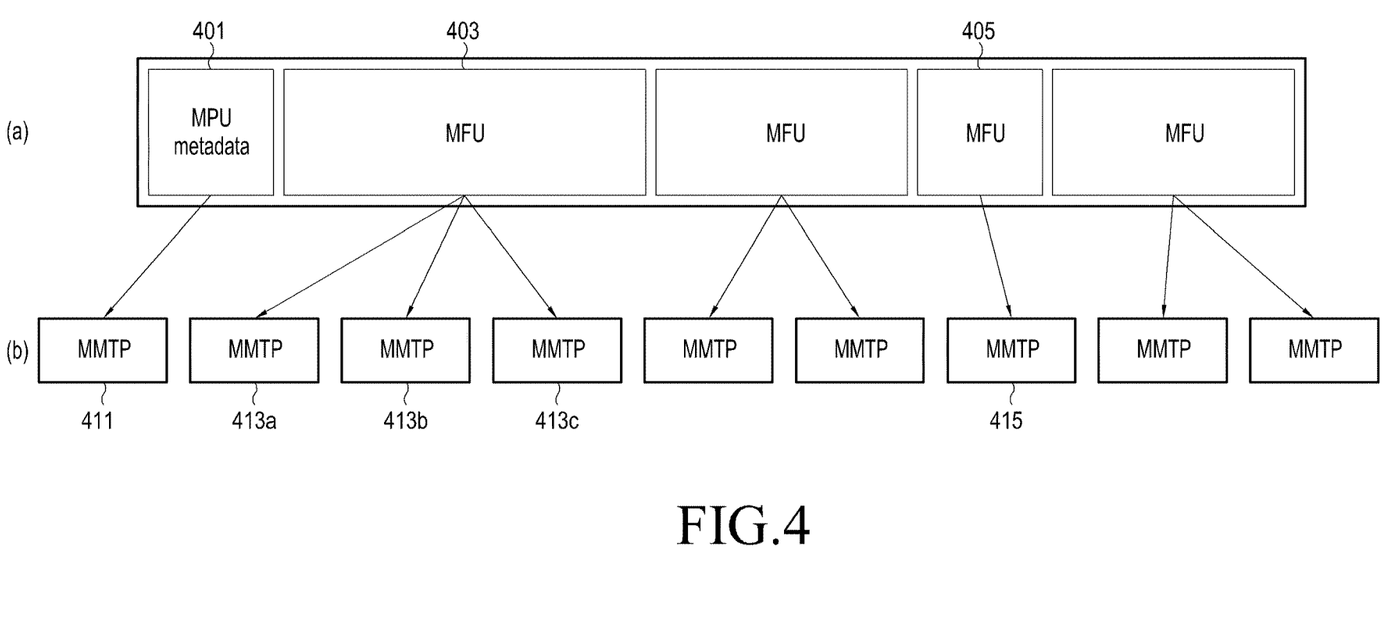
FIG. 4 is a view illustrating an example in which an MPU is divided into a plurality of MMTP packets to then be transmitted in a multimedia system according to the embodiment of the present disclosure.

FIG. 4 is a view illustrating an example in which an MPU is divided into a plurality of MMTP packets and is transmitted in a multimedia system according to the embodiment of the present disclosure.

(a) of FIG. 4 shows the structure of an MPU. The MPU may include MPU metadata 401 and a plurality of MFUs 403 and 405. (b) of FIG. 4 shows a plurality of MMTPs divided from the MPU. According to (a) and (b) of FIG. 4, it may be seen that the MPU metadata 401 and a plurality of MFUs 403 and 405 are packetized into a plurality of MMTP packets 411, 413a, 413b, 413c, and 415 to then be transmitted.

According to an embodiment, the MPU metadata 401 may be transmitted through the MMTP packet 411, and one MFU may be transmitted through one or more MMTP packets. That is, the MFU 403 may be divided into three MMTP packets 413a, 413b, and 413c to then be transmitted, and the MFU 405 may be transmitted using one MMTP packet 415. Although it is not shown in the drawings, the MPU metadata 401 may be divided into a plurality of MMTP packets to thus be transmitted.

The MMTP packet generated to transmit the MPU metadata and the MFU includes a header and a payload. The payload of the MMTP packet may include at least one of metadata, signaling information, and data of an intra-frame (I-frame) constituting image frames. The payload of the MMTP packet may include only null data, or some null data may be added to at least one of the signaling information or the data of an intra-frame (I-frame) constituting image frames. The null data may be added to maintain the data transmission rate of the MMTP packet constant. In this case, the null data may not be necessary when processing the media data.

When the null data is included, in whole or in part, in the payload of the MMTP packet, the header of the MMTP packet may include information indicating that the payload includes null data (a null type indicator, hereinafter, referred to as "NTI").

According to an embodiment, the NTI included in the header of the MMTP packet may indicate that the payload of the corresponding MMTP packet includes data other than the media stream. In this case, the NTI may instruct the receiving entity to not process the data contained in the payload of the MMTP packet. The data (or information), which is not required to be processed, may be null data other than the MPU metadata, the signaling information, or the intra-coded frame (I-frame) among the image frames.

In the above-described method, when the receiving entity detects an MMTP packet of which the header includes the NTI information from among the MMTP packets, the receiving entity may suspend the process of the data included in the payload of the corresponding MMTP packet, or may discard the data. For example, if the payload includes, in part, null data, the processing may be suspended for the remaining data. If the payload includes, in whole, null data, the processing of the MMTP packet may be abandoned and discarded.

As described above, the processing of the MMTP packet having the null data included in the payload makes it possible to use the content without interruption (that is, improving the quality of the media streaming service).

Figure 5:
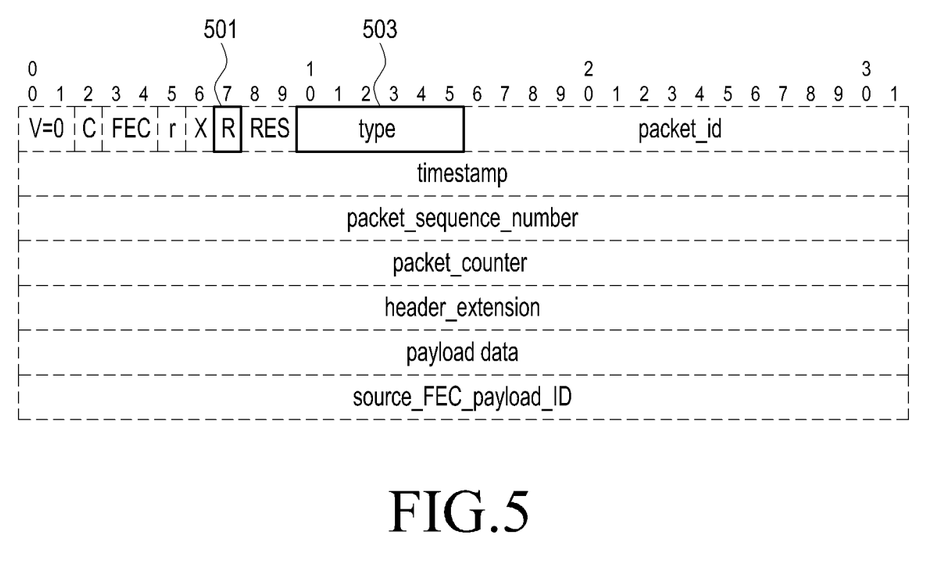
FIG. 5 is a view showing the structure of an MMTP packet in a multimedia system according to the embodiment of the present disclosure.

FIG. 5 is a view showing the structure of an MMTP packet in a multimedia system according to the embodiment of the present disclosure.

Referring to FIG. 5, a value recorded in the field "V" indicates the version of the MMTP, and a value recorded in the field "C" indicates whether or not there is a packet counter (packet_counter) field. A value recorded in the field "FEC" indicates the type of forward error correction (FEC) scheme used to prevent an error in the MMTP packet. The field "r" and the field "RES" are reserved to be used in the future, and a value recorded in the field "X" indicates whether or not there is a header extension (header_extension) field.

Type information, which can be recorded in the type field 503, may indicate the type of data recorded in the payload. The type information may indicate whether or not null data is included in the payload. For example, if the type information of the type field is "NULL type", it means that null data is included in the payload, and if the type information of the type field is not "NULL type", it means that null data is not included in the payload. In addition, the type information may indicate whether the null data is included in whole or in part in the payload.

If the payload does not include null data (if the type information is not "NULL type"), the type information may indicate the type of data included in the corresponding payload. The type of data, which can be included in the corresponding payload, may be one of MPU metadata, signaling information, or I-frame data of image frames. This may be applied equally to both timed media data and non-timed media data.

According to the method proposed above, when the receiving entity receives the media stream (MMTP packet) and reproduces the content (e.g., moving pictures or the like), the receiving entity may check whether or not the payload of the received MMTP packet includes null data through the type information recorded in the type field included in the header of the received MMTP packet. When the receiving entity recognizes that the payload of the MMTP packet includes, in whole or in part, the null data, the receiving entity may suspend the processing for the corresponding MMTP packet.

Therefore, the receiving entity may determine whether or not to process the corresponding MMTP packet by preferentially checking whether or not the NTI is recorded in the type field constituting the header of the MMTP packet. In addition, since the corresponding MMTP packet may, or may not, be processed based on the determination result, the processing time for the MMTP packet may be reduced. Furthermore, since the receiving entity may preferentially determine whether or not the payload is an MMTP packet including null data using the NTI, it is possible to quickly perform the reproducing, searching, or channel switching of moving pictures or the like without delay. For example, when the receiving entity preferentially determines whether or not null data is included using the NTI, it is possible to minimize the reproduction delay due to channel switching in the broadcast receiving environment, and to quickly perform the operations, such as double speed reproducing, rewinding, searching, or the like, without delay.

It is due to the fact that the data recorded in the payload can be discarded or the process thereof can be suspended without analyzing the same in the case of an MMTP packet in which the NTI is recorded in the type field.

As described above, in order to preferentially receive and process specific media data (e.g., the I-frame) or specific information (e.g., MPU metadata or signaling information), the NTI may be used to determine a portion including data other than the specific media data (or the specific information). In addition, in the case where the payload of an MMTP packet includes specific media data (or specific information), the header of the corresponding MMTP packet must not include the NTI.

The type field 503 indicates the type of payload data of the MMTP packet. For example, if the type information recorded in the type field has a value of "0x00" or "0X01", it means that the type of data included in the payload is media data. "0x00" indicates that the data included in the payload is a fragment of the MPU, and "0X01" indicates that the data included in the payload is one complete MPU.

For example, when a value recorded in the field "R" is "1" and the type information recorded in the type field is "0x00" or "0X01", it may be determined that the corresponding payload includes an I-frame. If the type information recorded in the type field is "0x02", it may be determined that the corresponding payload includes signaling information. If the type information recorded in the type field is "0x03", it may be determined that the corresponding payload includes, in part, null data. If the type information recorded in the type field is "0x04", it may be determined that the payload includes, in whole, null data. In addition, if the type field corresponds to an MPU mode of "0x00", the MPU metadata may be determined to have an MPU fragment type of 0.

The embodiment above can provide a method of providing a constant data transmission rate of a transmitter by inserting null data that does not need to be processed in order to transmit the MPU, which is media data generated by the transmitter to have a variable size, at a constant data transmission rate and a method of effectively determining the media process of media data through the NTI of a type field of the MMTP packet received by a receiver.

Figure 6:
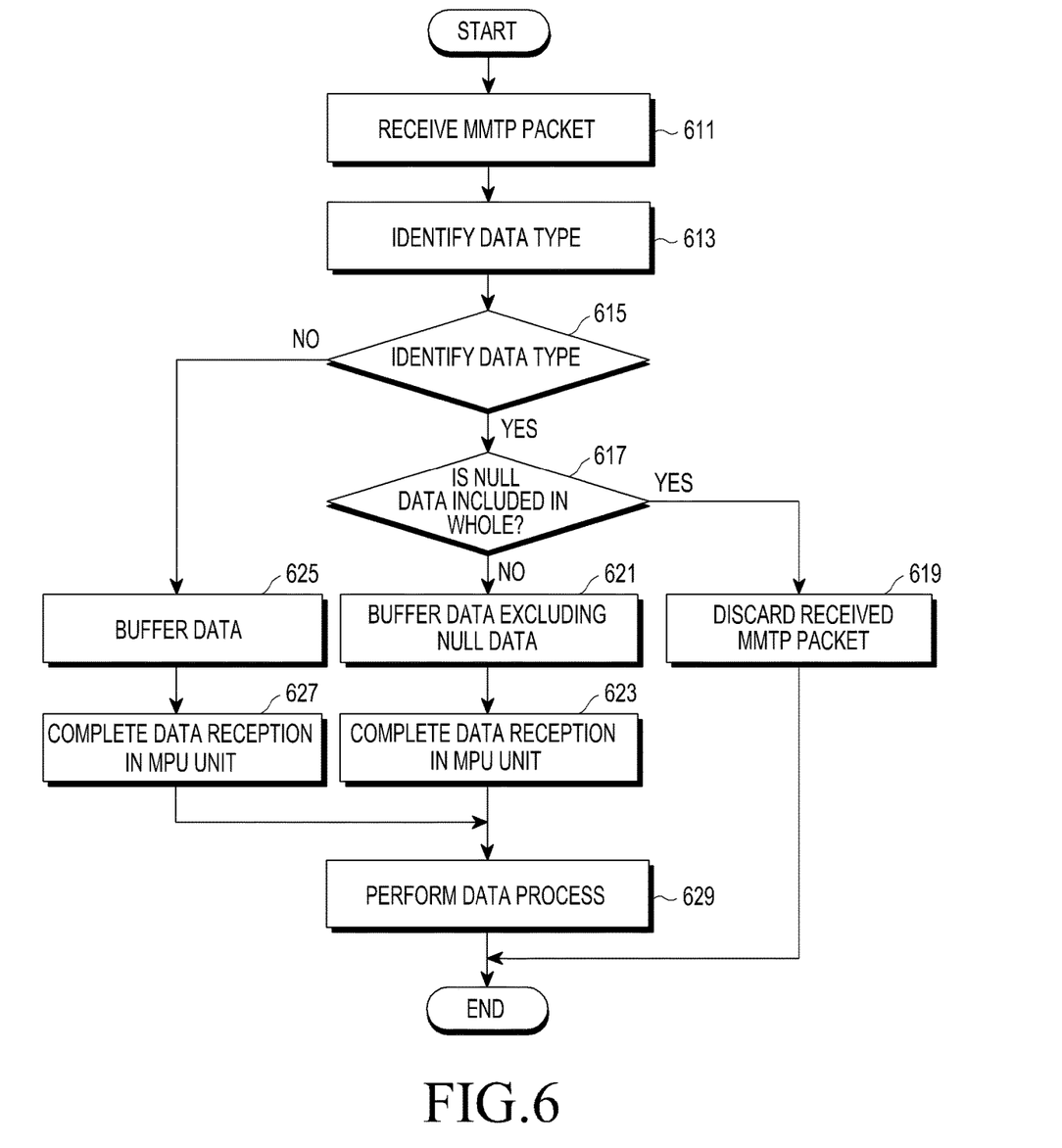
FIG. 6 is a view schematically illustrating the operation of an MMT receiving entity in a multimedia system according to an embodiment of the present disclosure.

FIG. 6 is a view schematically illustrating the operation of a receiving entity (a receiver of a multimedia device) in a multimedia system according to an embodiment of the present disclosure.

Referring to FIG. 6, the receiving entity receives an MMTP packet including a header and a payload (Step 611). The receiving entity identifies the type of data included in the payload based on type information recorded in the type field included in the header of the received MMTP packet (Step 613). The receiving entity may determine whether the payload includes, in whole or in part, null data by means of the type information recorded in the type field (Step 615 and Step 617). For example, if the type information is "0x04", it may be determined that the payload includes, in whole, the null data, and if the type information is "0x03", it may be determined that the payload includes, in part, the null data.

If it is determined that the payload includes, in whole, the null data, the receiving entity may discard the corresponding MMTP packet (Step 621). If it is determined that the payload includes, in part, the null data, the receiving entity may buffer the remaining data excluding the null data, which is included in the payload of the corresponding MMTP packet (Step 621). Thereafter, the receiving entity may complete data reception in the unit of MPUs (Step 623), and may then process the received data (Step 619).

If it is determine that the payload does not include null data, the receiving entity may start buffering of the data included in the payload of the corresponding MMTP packet (Step 625). Thereafter, the receiving entity may complete data reception in the unit of MPUs (Step 627), and may then process the received data (Step 619).

Meanwhile, although FIG. 6 illustrates the operation of the MMT receiving entity in the multimedia system according to an embodiment of the present disclosure, various modifications may be made with respect to FIG. 6. For example, although consecutive steps are shown in FIG. 6, it should be understood that the steps described in FIG. 6 may overlap each other, may occur in parallel with each other, may occur in different sequences, or may occur multiple times.

Now, although it is not shown in the drawings, the internal structure of the MMT sending entity and the internal structure of the MMT receiving entity in the multimedia system, according to an embodiment of the present disclosure, will be described.

First, the internal structure of the MMT sending entity in the multimedia system, according to an embodiment of the present disclosure, will be described.

The MMT sending entity includes a transmitter, a controller, a receiver, and a storage unit.

First, the controller controls overall operations of the MMT sending entity. The controller controls the MMT sending entity to perform overall operations related to packet transmission/reception operations according to an embodiment of the present disclosure. Here, the overall operations related to the packet transmission/reception operations are the same as those described with reference to FIGS. 2 to 6, and thus a detailed description thereof will be omitted here.

The transmitter transmits messages to the MMT receiving entity under the control of the controller. Here, the various messages transmitted by the transmitter are the same as those described with reference to FIGS. 2 to 6, and thus a detailed description thereof will be omitted here.

In addition, the receiver receives various messages from the MMT receiving entity under the control of the controller. Here, the various messages received by the receiver are the same as those described with reference to FIGS. 2 to 6, and thus a detailed description thereof will be omitted here.

The storage unit stores programs necessary for the operation of the MMT sending entity and a variety of data (in particular, information related to packet transmission/reception operations according to an embodiment of the present disclosure). In addition, the storage unit stores various messages that the receiver receives from the MMT receiving entity.

Meanwhile, in the above description, the MMT sending entity has been implemented by separate processors, such as the transmitter, the controller, the receiver, and the storage unit. However, at least two of the transmitter, the controller, the receiver, and the storage unit can be integrated into a single processor. In addition, the MMT sending entity may be implemented as a single processor.

Second, the internal structure of the MMT receiving entity in the multimedia system, according to an embodiment of the present disclosure, will be described.

The MMT receiving entity includes a transmitter, a controller, a receiver, and a storage unit.

First, the controller controls overall operations of the MMT receiving entity. The controller controls the MMT receiving entity to perform overall operations related to packet transmission/reception operations according to an embodiment of the present disclosure. Here, the overall operations related to the packet transmission/reception operations are the same as those described with reference to FIGS. 2 to 6, and thus a detailed description thereof will be omitted here.

The transmitter transmits messages to the MMT sending entity under the control of the controller. Here, the various messages transmitted by the transmitter are the same as those described with reference to FIGS. 2 to 6, and thus a detailed description thereof will be omitted here.

In addition, the receiver receives various messages from the MMT sending entity under the control of the controller.

Here, the various messages received by the receiver are the same as those described with reference to FIGS. 2 to 6, and thus a detailed description thereof will be omitted here.

The storage unit stores programs necessary for the operation of the MMT receiving entity and a variety of data (in particular, information related to packet transmission/reception operations according to an embodiment of the present disclosure). In addition, the storage unit stores various messages that the receiver receives from the MMT sending entity.

Meanwhile, in the above description, the MMT receiving entity is implemented by separate processors, such as the transmitter, the controller, the receiver, and the storage unit. However, at least two of the transmitter, the controller, the receiver, and the storage unit can be integrated into a single processor. In addition, the MMT receiving entity may be implemented as a single processor.

Further, the above embodiments of the present disclosure may be implemented by a computer-readable code in a computer-readable recording medium. The computer-readable recording medium may be any data storage device capable of storing data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The record-medium readable by the computer may be dispersed through network-connected computer systems, and thus a code readable by the computer may be stored and executed in a dispersion scheme. Further, functional programs, codes and code segments for achieving the present disclosure may be easily interpreted by programmers skilled in the art which the present disclosure pertains to.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It can be also appreciated that the memory included in the mobile terminal is one example of machine-readable devices suitable for storing a program including instructions that are executed by a processor device to thereby implement embodiments of the present disclosure.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Meanwhile, although the concrete embodiments of the present disclosure have been described in the detailed description of the present disclosure, various modifications can be made without departing from the scope of the present disclosure. Therefore, the scope of the present disclosure should not be defined as being limited to the embodiments, but should be defined by the appended claims and equivalents thereof.

The invention claimed is:

1. A method of processing a multimedia packet in a multimedia device, the method comprising:
   receiving the multimedia packet including a header including a type information field and a payload including a type of data indicated by the type information field;
   processing data included in the payload when it is recognized, through the type information field, that null data is not included in the payload;
   when a whole of the payload comprises the null data, the type information field is configured to provide a first indication;
   when a part of the payload comprises the null data, the type information field is configured to provide a second indication, different from the first indication; and
   when the type of data included in the payload is one of signaling information or data of an intra-frame (I-frame) constituting image frames, the type information field is configured to provide a third indication different from the first indication or the second indication.

2. The method of claim 1, further comprising suspending the processing of the data included in the payload when it is recognized, through the type information field, that the payload includes the null data.

3. The method of claim 1, wherein when it is recognized, through the type information field, that the payload includes the null data, data included in the payload is not processed.

4. The method of claim 1, wherein the type of data included in the payload is one of the null data, metadata, the signaling information, or the data of the intra-frame constituting the image frames.

5. The method of claim 2, wherein the suspending of the processing of the data included in the payload comprises processing the multimedia packet, in which the type information field indicates that the null data is not included in the payload, in preference to a multimedia packet in which the type information field indicates that the null data is included in the payload.

6. A method of transmitting a multimedia packet in a multimedia device, the method comprising:
   generating a multimedia packet using a header and a payload; and
   transmitting the generated multimedia packet,
   wherein the generating of the multimedia packet comprises:
     determining whether or not null data needs to be added to the payload;
     when it is determined that the null data needs to be added to the payload, the generating of the multimedia packet using the payload comprises, in whole or in part, the null data and the header including a type information field, wherein the type information is configured to provide a first indication when a part of the payload comprises the null data and the type information is configured to provide a second indication, different from the first indication, when a whole of the payload comprises the null data;

determining whether a type of data to be added to the payload is one of signaling information or data of an intra-frame (I-frame) constituting image frames; and when it is determined that the one of the signaling information or the data of the intra-frame constituting the image frames needs to be added to the payload, the generating of the multimedia packet using the payload comprises, the one of signaling information or the data of the intra-frame constituting the image frames and the header including the type information field, which is configured to provide a third indication different from the first indication or the second indication.

7. The method of claim 6, wherein the generating of the multimedia packet further comprises:

when it is determined that the null data does not need to be added to the payload, determining a type of data to be included in the payload from among metadata, the signaling information, and the data of the intra-frame constituting the image frames; and generating the multimedia packet by the header including the type information field, which indicates the determined type of data, and the payload including data corresponding to the determined type of data.

8. The method of claim 6, wherein the determining of whether or not the null data needs to be added to the payload comprises determining whether or not the null data needs to be added to the payload by considering a transmission rate of the multimedia packet and a transmission rate of another multimedia packet.

9. A multimedia device comprising:

a receiver that receives a multimedia packet including a header including a type information field and a payload including a type of data indicated by the type information field; and a processor configured to process data included in the payload when it is recognized, through the type information field, that null data is not included in the payload, wherein when a whole of the payload comprises the null data, the type information field is configured to provide a first indication, wherein when a part of the payload comprises the null data, the type information field is configured to provide a second indication, different from the first indication, and wherein when the type of data included in the payload is one of signaling information or data of an intra-frame (I-frame) constituting image frames, the type information field is configured to provide a third indication different from the first indication or the second indication.

10. The multimedia device of claim 9, wherein the processor is further configured to suspend the processing of the data included in the payload when it is recognized, through the type information field, that the payload includes the null data.

11. The multimedia device of claim 9, wherein when it is recognized that the null data is included in the payload through the type information field, the processor is further configured to not process data included in the payload.

12. The multimedia device of claim 9, wherein the type of data included in the payload is one of the null data, metadata, the signaling information, or the data of the intra-frame constituting the image frames.

13. The multimedia device of claim 9, wherein the processor is further configured to process the multimedia packet, in which the type information field indicates that the null data is not included in the payload, in preference to a multimedia packet in which the type information field indicates that the null data is included in the payload.

14. A multimedia device comprising:

a processor configured to:

generate a multimedia packet using a header and a payload, when it is determined that null data needs to be added to the payload, generate the multimedia packet using the payload including, in whole or in part, the null data and the header including a type information field, wherein the type information is configured to provide a first indication when a part of the payload comprises the null data and the type information is configured to provide a second indication, different from the first indication, when a whole of the payload comprises the null data, and when it is determined that one of signaling information or data of an intra-frame (I-frame) constituting image frames needs to be added to the payload, generate the multimedia packet using the payload comprising, the one of signaling information or the data of the intra-frame constituting the image frames and the header including the type information field, which is configured to provide a third indication different from the first indication or the second indication; and a transmitter that transmits the generated multimedia packet.

15. The multimedia device of claim 14, wherein the processor is further configured to:

when it is determined that the null data does not need to be added to the payload, determine a type of data to be included in the payload from among metadata, the signaling information, and the data of the intra-frame constituting the image frames, and generate the multimedia packet by the header including the type information field, which indicates the determined type of data, and the payload including data corresponding to the determined type of data.

16. The multimedia device of claim 14, wherein the processor is further configured to determine whether or not the null data needs to be added to the payload by considering a transmission rate of the multimedia packet and a transmission rate of another multimedia packet.

* * * * *